(12) United States Patent
Raizen et al.

(10) Patent No.: US 8,468,241 B1
(45) Date of Patent: Jun. 18, 2013

(54) ADAPTIVE OPTIMIZATION ACROSS INFORMATION TECHNOLOGY INFRASTRUCTURE

(75) Inventors: Helen S. Raizen, Jamaica Plain, MA (US); David Stephen Reiner, Lexington, MA (US); Robert J. Pellowski, Ledyard, CT (US); Harold M. Sandstrom, Belmont, MA (US); Harrison K. Roberts, Boxborough, MA (US)

(73) Assignee: EMC Corporation, Hopkinton, MA (US)

(*) Notice: Subject to any disclaimer, the term of this patent is extended or adjusted under 35 U.S.C. 154(b) by 217 days.

(21) Appl. No.: 13/077,376

(22) Filed: Mar. 31, 2011

(51) Int. Cl.
*G06F 15/16* (2006.01)
(52) U.S. Cl.
USPC .......................................... 709/224; 709/223
(58) Field of Classification Search
USPC .......................... 709/200–202, 223–224, 225
See application file for complete search history.

(56) References Cited

U.S. PATENT DOCUMENTS

| | | | | |
|---|---|---|---|---|
| 5,712,966 | A * | 1/1998 | Nadachi | 345/428 |
| 7,526,541 | B2 * | 4/2009 | Roese et al. | 709/223 |
| 7,581,249 | B2 * | 8/2009 | Bussiere et al. | 726/22 |
| 7,739,372 | B2 * | 6/2010 | Roese et al. | 709/223 |
| 8,131,992 | B2 * | 3/2012 | Ennis et al. | 713/100 |
| 2001/0027470 | A1 * | 10/2001 | Ulmer et al. | 709/203 |
| 2004/0186903 | A1 * | 9/2004 | Lambertz | 709/224 |
| 2006/0085836 | A1 * | 4/2006 | Lyons et al. | 726/1 |
| 2008/0281607 | A1 * | 11/2008 | Sajja et al. | 705/1 |
| 2008/0281660 | A1 * | 11/2008 | Sajja et al. | 705/8 |
| 2009/0271589 | A1 | 10/2009 | Karpoff et al. | |
| 2009/0319658 | A1 * | 12/2009 | Chioiu et al. | 709/224 |
| 2011/0004914 | A1 * | 1/2011 | Ennis et al. | 726/1 |
| 2012/0198057 | A1 * | 8/2012 | Ennis et al. | 709/224 |

OTHER PUBLICATIONS

David Reiner et al., "A Method for Adaptive Performance Improvement of Operating Systems," ACM Sigmetrics Conference on Measurement and Methodology of Computer Systems, Sep. 1981, pp. 2-10.
David Stephen Reiner, Ph.D. Dissertation, "A Method for Adaptive Performance Improvement of Operating Systems," The University of Wisconsin—Madison, 1980, No. 80-23427, 185 pages.
U.S. Appl. No. 12/494,622, filed in the name of Dean D. Throop et al. on Jun. 30, 2009 and entitled "Facilitating Data Migration Between Tiers."
U.S. Appl. No. 12/639,668, filed in the name of David Stephen Reiner on Dec. 16, 2009 and entitled "Data Storage System Having Associated Situational Analysis Framework for Automatic Response to Movement in a State Space."

* cited by examiner

*Primary Examiner* — Moustafa M Meky
(74) *Attorney, Agent, or Firm* — Ryan, Mason & Lewis, LLP (57) ABSTRACT

A processing platform comprises at least one server, computer or other processing device having a processor coupled to a memory, and implements a plurality of modules for adaptive optimization across an information technology (IT) infrastructure. The modules include a collector configured to gather information from the infrastructure, an analyzer coupled to the collector and configured to analyze the information gathered by the collector, a policy module specifying a plurality of policy sets, and a controller that is coupled to the collector, the analyzer and the policy module. The controller is configured to adjust one or more parameters of the infrastructure via corresponding control points. Associated with the analyzer is a situational analysis framework configured to periodically select and deploy for use by the controller a particular one of the specified plurality of policy sets responsive to changing operating conditions of the infrastructure. The infrastructure may comprise a virtual data center (VDC) or other type of virtual infrastructure.

20 Claims, 7 Drawing Sheets

ADAPTIVE OPTIMIZATION ACROSS INFORMATION TECHNOLOGY INFRASTRUCTURE

FIELD OF THE INVENTION

The present invention relates generally to the field of information processing, and more particularly to techniques for managing performance of information technology (IT) infrastructure in an information processing system.

BACKGROUND OF THE INVENTION

Information processing systems comprising virtual data centers (VDCs) and other types of virtual infrastructure are coming into increasingly widespread use. For example, commercially available virtualization software such as VMware® vSphere™ may be used to build a variety of different types of virtual infrastructure, including private and public cloud computing and storage systems, distributed across hundreds of interconnected physical computers and storage devices. As the complexity of such cloud-based systems increases, the need for accurate and efficient management of the corresponding shared resources has also grown. It should be noted that virtual infrastructure in combination with its associated physical infrastructure may be viewed as an example of what is more generally referred to herein as "IT infrastructure."

Achieving service level objectives (SLOs) within a VDC or other type of system comprising virtual infrastructure can be particularly challenging since the virtualized environment is inherently both complex and opaque. Conventional approaches to managing such complex multi-layered systems have required labor-intensive monitoring at multiple levels. However, it is often very difficult for human administrators using traditional management tools to monitor status at multiple levels, to react to dynamic workload changes, and to achieve fairness in use of the shared resources while also achieving SLOs.

The conventional approaches therefore fail to provide an efficient mechanism for translating between application needs and corresponding actions that should be taken within infrastructure elements such as storage platforms and host software. As a result, in conventional practice there is often a significant disconnect between application context and those actions that if carried out in particular infrastructure elements would best facilitate achievement of the designated SLOs.

Accordingly, a need exists for an improved approach to performance management in an information processing system.

SUMMARY OF THE INVENTION

An illustrative embodiment of the present invention provides an information processing system configured for adaptive input/output optimization or other types of performance optimization across an IT infrastructure of the system. In this embodiment, actions within the IT infrastructure are undertaken in a coordinated manner that facilitates the achievement of SLOs for corresponding applications. The IT infrastructure may comprise a VDC or other type of virtual infrastructure.

In one aspect, a processing platform comprises at least one server, computer or other processing device having a processor coupled to a memory, and implements a plurality of modules for adaptive optimization across an IT infrastructure. More particularly, the modules comprise a collector configured to gather information from the infrastructure, an analyzer coupled to the collector and configured to analyze the information gathered by the collector, a policy module specifying a plurality of policy sets, and a controller that is coupled to the collector, the analyzer and the policy module. The controller is configured to adjust one or more parameters of the infrastructure via corresponding control points.

Associated with the analyzer is a situational analysis framework configured to periodically select and deploy for use by the controller a particular one of the specified plurality of policy sets responsive to changing operating conditions of the infrastructure. By way of example, the situational analysis framework may be configured to determine dimensions of a situational state space characterizing the operating conditions of the infrastructure, to partition the situational state space into states, to associate the policy sets with respective states of the state space, to monitor system operation in the state space, and to select a particular one of the policy sets based on an identified current state in the state space.

The analyzer in one or more illustrative embodiments may be operative to translate between SLOs of a given virtual application and key performance indicators associated with particular components of the infrastructure.

The illustrative embodiments of the invention advantageously overcome one or more of the above-noted drawbacks of conventional approaches. For example, an information processing system in one or more of these embodiments avoids the need for labor-intensive monitoring at multiple levels of the system by human administrators using traditional management tools, and provides an efficient automated mechanism for translating between application needs and corresponding actions that should be taken within virtual infrastructure or other types of IT infrastructure. This eliminates the conventional disconnect between application context and those actions that if carried out in particular elements of the IT infrastructure would best facilitate achievement of SLOs. Such an information processing system is therefore better able to react to dynamic workload changes and to achieve fairness in use of shared resources while also achieving the SLOs in an automated and efficient manner.

These and other features and advantages of the present invention will become more readily apparent from the accompanying drawings and the following detailed description.

DETAILED DESCRIPTION

The present invention will be described herein with reference to exemplary information processing systems and associated servers, computers, storage devices, virtual machines and other processing devices. It is to be appreciated, however, that the invention is not restricted to use with the particular illustrative system and device configurations shown. Moreover, the term "information processing system" as used herein is intended to be broadly construed, so as to encompass, for example, private or public cloud computing or storage systems, as well as other types of systems comprising virtual infrastructure.

Figure 1A:
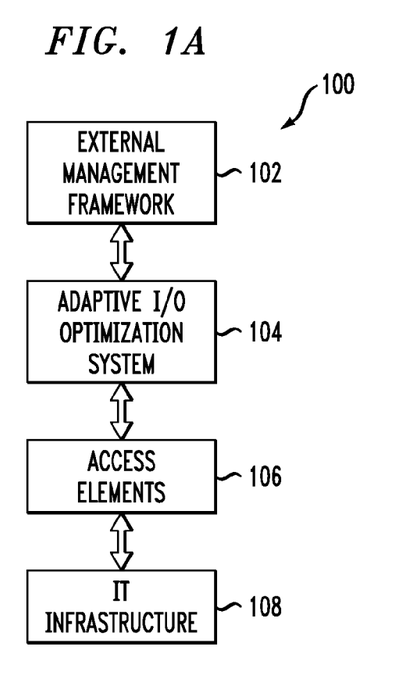
FIGS. 1A, 1B and 1C show different views of portions of an information processing system that incorporates functionality for adaptive optimization across an IT infrastructure.

FIG. 1A shows an information processing system 100 configured in accordance with an illustrative embodiment of the present invention. The information processing system 100 comprises an external management framework 102 that serves as an interface between the system 100 and external users, such as employees, managers, administrators or other entities, including other automated management components or frameworks. A given such entity is an example of what is more generally referred to herein as a "system user" or simply a "user." The external management framework 102 in this embodiment comprises multiple user interface (UI) elements, as will be described in greater detail below in conjunction with FIG. 1B. Such UI elements may comprise stand-alone interface elements or various management system components, in any combination.

The system 100 further comprises an adaptive input/output (I/O) optimization system 104, which in the present embodiment implements a plurality of processing modules collectively configured to perform adaptive input/output optimization. Examples of these processing modules are illustratively shown in FIG. 1B. In alternative embodiments, other types of performance optimizations may be performed in system 100, using other types and arrangements of modules.

The adaptive input/output optimization system 104 is interfaced via access elements 106 with IT infrastructure 108 of the information processing system 100. The adaptive input/output optimization system 104 controls utilization, configuration and other characteristics of various information technology resources of IT infrastructure 108 via the access elements 106. It should be noted that communications between the various elements of the system 100 may be accomplished using in-band mechanisms, out-of-band mechanisms, or combinations of in-band and out-of-band mechanisms.

Figure 1B:
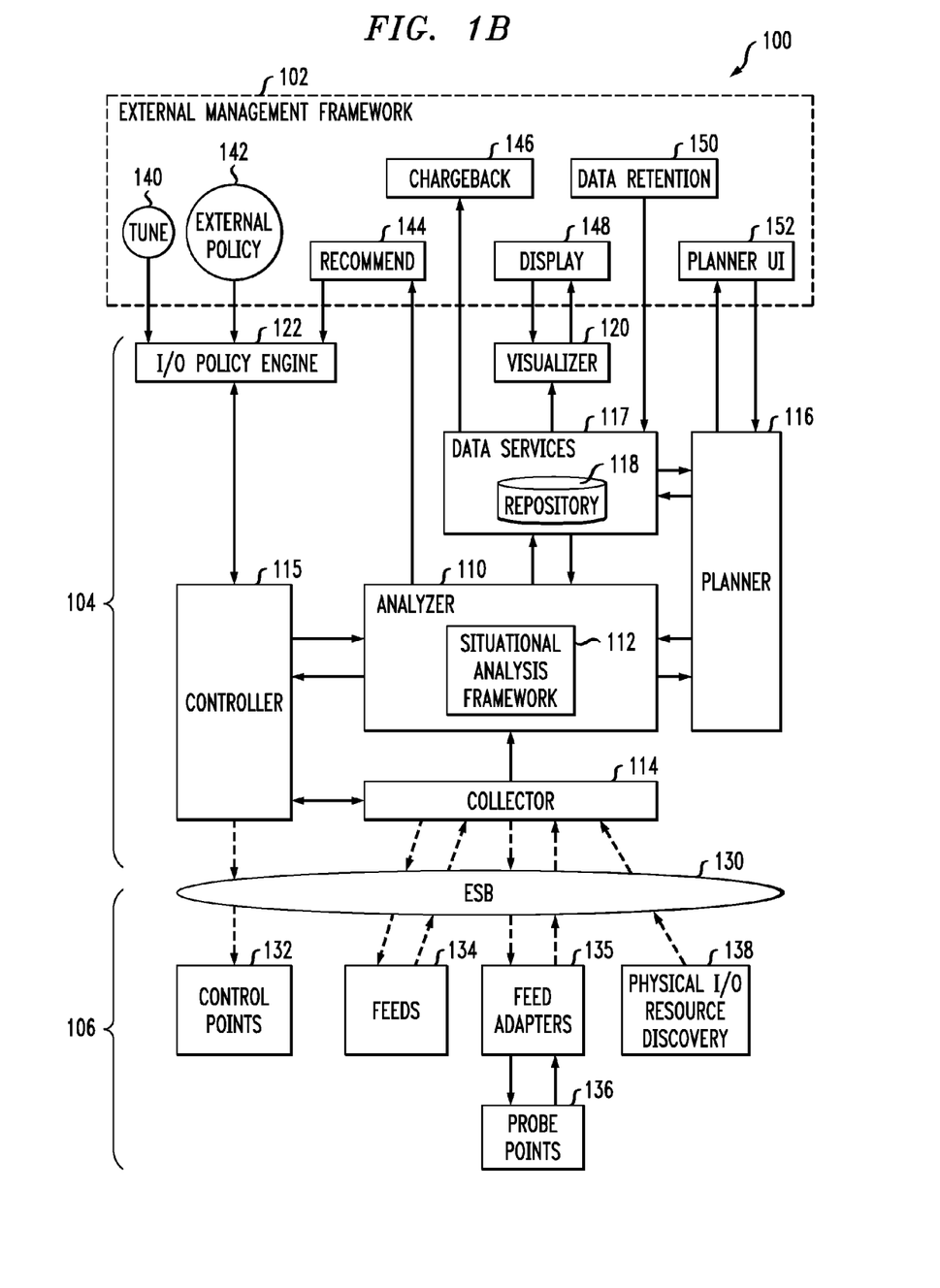
Figure 1C:
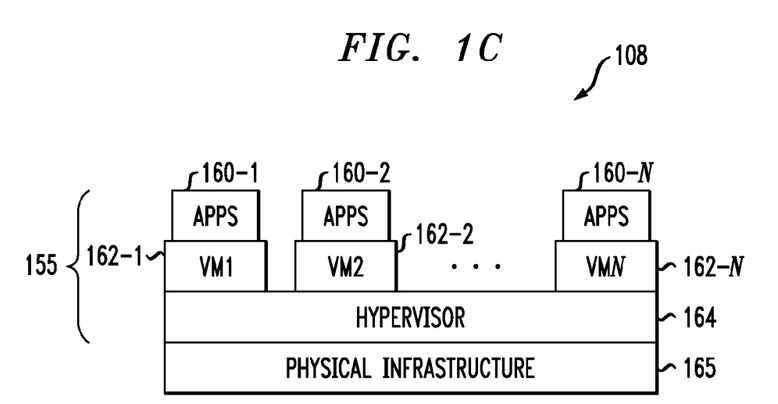

As shown in FIG. 1C, the IT infrastructure 108 comprises virtual infrastructure 155, which in this embodiment includes, by way of example, sets of applications 160-1, 160-2, . . . 160-N running on respective virtual machines (VMs) 162-1, 162-2, . . . 162-N under the control of a hypervisor 164. These virtual infrastructure elements are associated with underlying physical infrastructure 165, and may collectively implement, for example, at least a portion of a VDC. Although only a single hypervisor is shown in the example of FIG. 1C, a given embodiment of a VDC configured in accordance with the invention may include multiple hypervisors, each running on its own compute/memory physical infrastructure. Portions of that physical infrastructure might be virtualized.

An example of a commercially available hypervisor platform that may be used to implement portions of the virtual infrastructure 155 in one or more embodiments of the invention is the VMware® vSphere™ which may have an associated virtual infrastructure management system such as the VMware® vCenter™. The underlying physical infrastructure 165 may comprise one or more distributed processing platforms that include hardware products such as Celerra® or CLARiiON®, both commercially available from EMC Corporation of Hopkinton, Mass. A variety of other storage products, such as VNX and Symmetrix VMAX, both also from EMC Corporation, may be utilized to implement at least a portion of the IT infrastructure 108.

Although the system elements 102, 104, 106 and 108 are shown as separate elements in FIG. 1A, these elements or portions thereof may be implemented at least in part on a common processing platform. For example, one or more of the modules of the adaptive input/output optimization system 104 may each be implemented at least in part within the virtual infrastructure 155. Thus, the processing platform utilized to implement various elements of system 100 may be at least partially virtual, in that it may comprise one or more virtual machines. In other embodiments, one or more of the system elements 102, 104, 106 and 108 may each be implemented on a separate processing platform.

Referring again to FIG. 1B, the processing modules 104 which collectively perform adaptive input/output optimization in system 100 include an analyzer 110, a situational analysis framework 112 implemented within the analyzer 110, a collector 114, a controller 115, a planner 116, a data services module 117 having an associated repository 118, a visualizer 120 and an input/output policy engine 122. The collector 114 is configured to gather information from the IT infrastructure 108 of FIG. 1A using the access elements 106. The analyzer 110 is coupled to the collector and configured to analyze the information gathered by the collector. For example, the analyzer 110 may associate performance information from different layers in the IT infrastructure stack of FIG. 1C with linked objects to show the performance at multiple layers down the stack. This may involve, for example, determination of key performance indicators (KPIs) associated with particular components of the virtual infrastructure 155 or other parts of the IT infrastructure 108, and mapping or other translation between SLOs and KPIs. The SLOs will generally be received from the input/output policy engine 122, but may additionally or alternatively be received from other system elements.

The input/output policy engine 122 is an example of what is more generally referred to herein as a policy module, and such a module is generally configured to store or otherwise specify a plurality of policy sets, based at least in part on information received from elements of the external management framework 102. In other embodiments, such a module may be implemented as a policy set repository.

The situational analysis framework 112 associated with the analyzer 110 is configured to periodically select and deploy for use by at least the controller 115, and possibly one or more additional system elements, a particular one of the specified plurality of policy sets responsive to changing operating conditions of the IT infrastructure 108. One possible implementation of the situational analysis framework 112 will be described in greater detail below in conjunction with FIG. 6. It should be understood that, although the situational analysis framework 112 is shown as implemented within the analyzer 110 in FIG. 1B, it may be implemented at least in part within one or more other system elements, or as one or more separate stand-alone elements, in other embodiments. For example, a learning module of the situational analysis framework may be implemented as a stand-alone module while a production module of the situational analysis framework is implemented within the analyzer.

The controller 115 is coupled to the collector 114, the analyzer 110 and the input/output policy engine 122, and is configured to direct at least a portion of the operations of each of these elements. The controller 115 is also configured to adjust one or more parameters of the IT infrastructure 108 of FIG. 1A via corresponding control points, responsive to a particular policy set selected and deployed by the situational analysis framework 112 of the analyzer 110, as will be described below. In other embodiments, the controller 115 may be configured to control one or more additional or alternative system elements. The term "controller" as used herein is therefore intended to be broadly construed, and in other embodiments may encompass at least a portion of one or more other elements of system 100.

The data services module 117 having repository 118 is coupled between the analyzer 110 and the visualizer 120, and is also coupled to the planner 116.

The processing modules 104 access the IT infrastructure 108 through the access elements 106, which illustratively include an enterprise service bus (ESB) 130. It should be noted that the ESB 130 may be eliminated in other embodiments, with particular ones of the processing modules 104 interacting directly with the remaining access elements 106.

The controller 115 in the present embodiment is interfaced through the ESB 130 to control points 132. The control points 132 may represent access points to particular IT infrastructure elements such as a virtual host, storage array, switch or storage area network (SAN). Responsive to a particular policy set selected and deployed by the situational analysis framework 112 of analyzer 110, the controller 115 makes appropriate adjustments to the IT infrastructure 108 via the control points 132.

The collector 114 in the present embodiment is interfaced through the ESB 130 to other access elements 106 including performance feeds 134, feed adaptors 135 to probe points 136, and physical input/output resource discovery elements 138 associated with the IT infrastructure 108 for gathering operating condition information from elements of that infrastructure, such as storage arrays, hosts, virtual machines, etc. The performance feeds 134 may comprise designated information feeds from these or other IT infrastructure elements. Typically, the performance feeds 134 are subscription-based feeds, while the probe points 136 operate in accordance with a request-response model. The feed adaptors 135 generate requests to and receive responses from the probe points 136, thereby providing in effect a feed interface for the collector 114 to gather input from the probe points 136. The feed adaptors 135 and associated probe points 136 may also be used to implement passive feeds that are accessed through a "pull" model.

As indicated previously, the external management framework 102 comprises a plurality of UI elements, including a tuning element 140, an external policy element 142 and a recommendation element 144. The input/output policy engine 122 is coupled between these elements and the controller 115. The recommendation element 144 has an input coupled to an output of the analyzer 110. The external management framework 102 further includes a chargeback element 146, a display element 148, a data retention element 150, and a planner UI element 152. The chargeback element 146 and the data retention element 150 are both coupled to the data service module 117. The display element 148 is coupled to the visualizer 120, and the planner UI element 152 is coupled to the planner 116.

The planner 116 may be configured to perform operations such as capacity planning and what-if analysis. For example, it may look at trends in storage utilization or network utilization and alert a user when more capacity is needed. It could also recommend where to place new virtual machines to keep input/output load balanced across the IT infrastructure 108, or it may predict improvements that could result by moving virtual machines, purchasing additional infrastructure elements, or taking other actions within the system. One or more functions of the planner 116 may be invoked by the situational analysis framework 112 in response to movement within a state space.

Although shown as being separate from the modules 104 in the present embodiment, the external management framework 102 and access elements 106 may each be implemented as one or more corresponding modules within the set of modules 104 in other embodiments. The operation of the modules 104 will be described in greater detail below with reference to FIGS. 3 through 7.

The adaptive input/output optimization functionality implemented in information processing system 100 can provide policy-based SLO management across thousands of virtual machines and other elements of the virtual infrastructure 155. As noted previously, application SLOs can be translated by the system to corresponding KPIs that can be monitored. Remediation of any detected application SLO issues can be achieved through automated actions initiated by the situational analysis framework 112.

As indicated above, the system 100 can receive tuning input from users, via tuning element 140 or other input mechanisms. For example, user input may direct that particular types of improvements are desired in the system, such as improved throughput performance or reduced equipment or operating costs. The adaptive input/output functionality advantageously creates an abstraction that provides automation responsive to such tuning input and hides the underlying complexity from the user.

It is to be appreciated that the particular arrangement of modules 104 shown in FIG. 1B is presented by way of illustrative example only, and in other embodiments different arrangements of additional or alternative modules may be used. Moreover, the functionalities associated with separate modules in FIG. 1B may be combined into a lesser number of modules each of which performs multiple functions. Thus, at least a subset of the processing modules 104 may be collectively implemented on a common processing platform, or each such module may be implemented on a separate processing platform comprising one or more servers, computers, storage devices, virtual machines or other processing devices.

Figure 2:
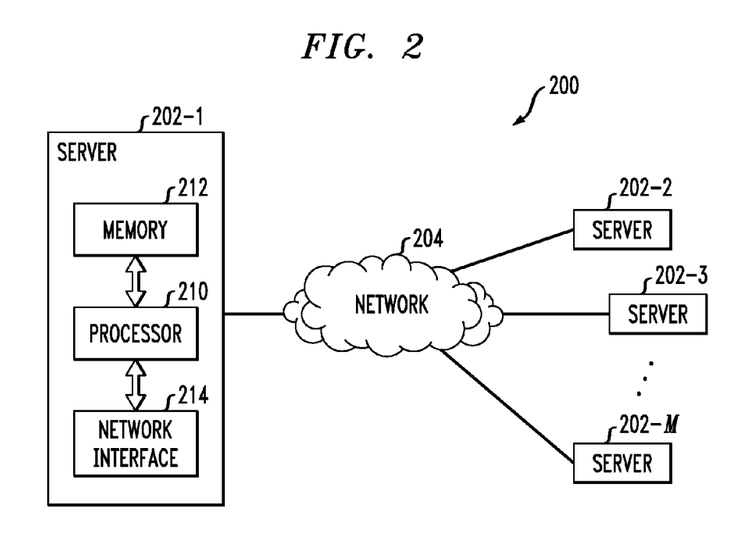
FIG. 2 shows an exemplary processing platform that implements at least a portion of the FIG. 1 system.

An example of such a processing platform is processing platform 200 shown in FIG. 2. The processing platform 200 in this embodiment comprises a portion of the system 100 and includes a plurality of servers, denoted 202-1, 202-2, 202-3, . . . 202-M, which communicate with one another over a network 204. One or more of the processing modules 104 of system 100 may therefore each run on a server, computer, or other processing platform element. A given such element may be viewed as an example of what is more generally referred to herein as a "processing device." As illustrated in FIG. 2, such a device generally comprises at least one processor and an associated memory, and implements one or more functional modules or other components for controlling certain features of the information processing system 100. Again, multiple ones of the processing modules 104 may be implemented by a single processing device in a given embodiment. Also, it should be noted that a given processing device may comprise one or more virtual machines.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product" having executable computer program code embodied therein. Such a memory may comprise electronic memory such as random access memory (RAM), read-only memory (ROM) or other types of memory, in any combination. The computer program code when executed by a processing device such as the server 202-1 causes the device to perform functions associated with one or more of the modules 104. One skilled in the art would be readily able to implement such software given the teachings provided herein. Other examples of computer program products embodying aspects of the invention may include, for example, optical or magnetic disks, or other storage devices, or suitable portions or combinations of such devices. In addition to storing computer program code, such storage devices will also generally be used to store data within system 100.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage arrays, storage volumes, etc. Again, the particular processing platform shown in the figure is presented by way of example only, and system 100 may include additional or alternative processing platforms, as well as numerous distinct processing platforms in any combination.

It is to be appreciated that a given embodiment of the system 100 may include multiple instances of the elements 102, 104, 106 and 108, and other system elements, although only single instances of such elements are shown in the system diagram for clarity and simplicity of illustration.

Also, numerous other arrangements of servers, computers, storage devices, virtual machines or other processing devices are possible in the information processing system 100. Such devices can communicate with other elements of the information processing system 100 over any type of network, such as a wide area network (WAN), a local area network (LAN), a satellite network, a telephone or cable network, or various portions or combinations of these and other types of networks.

The operation of the processing modules 104 will now be described in greater detail with reference to FIGS. 3 through 7.

Figure 3:
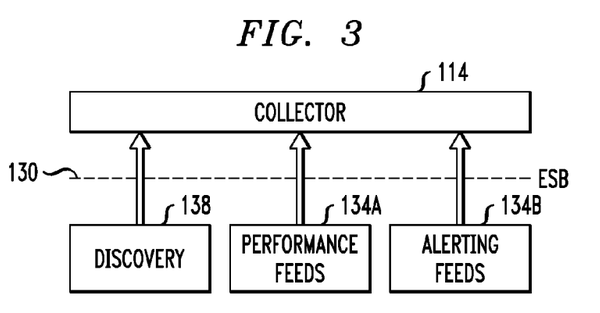
FIGS. 3, 4 and 5 illustrate processing operations in portions of the FIG. 1 system.

Referring initially to FIG. 3, the collector 114 gathers information regarding the IT infrastructure 108 by interacting with performance feeds 134A, alerting feeds 134B, and resource discovery elements 138 over the ESB 130. As indicated previously, ESB 130 may be eliminated in other embodiments, with the processing modules 104 communicating directly with the remaining access elements 106. Such communication may be carried out via a network of the type previously mentioned, or any other suitable communication mechanism.

Figure 4:
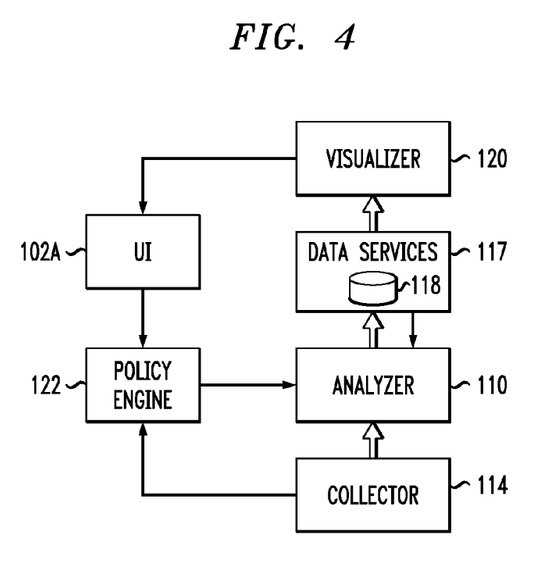

The collector 114 provides the information that it gathers to the analyzer 110, as illustrated in FIG. 4. The policy engine 122 determines an appropriate set of KPIs based on input from at least one UI element 102A, and/or possibly other system elements, and provides the set of KPIs to the analyzer 110.

Processing of the KPIs in the system 100 may involve transforming KPIs between layers of the infrastructure stack. For example, as a given input/output transaction traverses the layers of the infrastructure stack, it is transformed to operate on different objects, and the corresponding KPIs are also transformed to metrics that are appropriate for those objects. In a typical implementation, at the top of the infrastructure stack is an application SLO that may be further expressed in terms of KPIs on the virtual devices used by the application. As the input/output transaction moves down the stack, it operates on different objects and the KPIs have to be translated or otherwise transformed, because the objects they are being measured against are different.

It should be noted that the various layers of the infrastructure stack may be associated with different domains of control. For example, in a storage platform arrangement of a VDC, application and virtual machine layers may be in a control domain of a tenant, while virtual machine and hypervisor layers are in the control domain of a VDC administrator, and the physical infrastructure elements such as input/output circuitry and the storage arrays are in a control domain of a storage administrator. As another example, in a cloud storage arrangement, application and virtual machine layers may again be in a control domain of a tenant, while virtual machine, hypervisor, input/output circuitry and storage-as-a-service layers are in a control domain of a cloud administrator. In these and other layered infrastructure arrangements, KPIs may be translated as indicated above among the various layers.

The analyzer 110 utilizes the information supplied by the collector 114 to compute current values of the KPIs for the IT infrastructure 108. The data services module 117 stores the computed current values for the KPIs in its repository 118, and also supplies these values to visualizer 120 for display or other presentation via the UI element 102A. The KPIs may be any type of performance indicator, such as, for example, input-outputs per second (IOPS), transactions per second (TPS), average service time (AST), average response time (ART), response time consistency, utilization and availability. The response time consistency may comprise, for example, a mean response time (MRT) and an associated response time variance. One or more of these and other performance metrics may be associated with a given SLO. Such SLOs may be stored, for example, in association with particular elements of the virtual infrastructure 155. Also, SLOs may be set automatically for particular types of applications, for example, based on knowledge of best practices, performance relationships or other types of performance models.

The collector 114 in the present embodiment may also provide the input/output policy engine 122 with information related to policy that is stored in the IT infrastructure 108. For example, such policy-related information may be derived from Open Virtualization Format (OVF) information used as a template for provisioning and managing virtual machines 162 of the virtual infrastructure 155.

Figure 5:
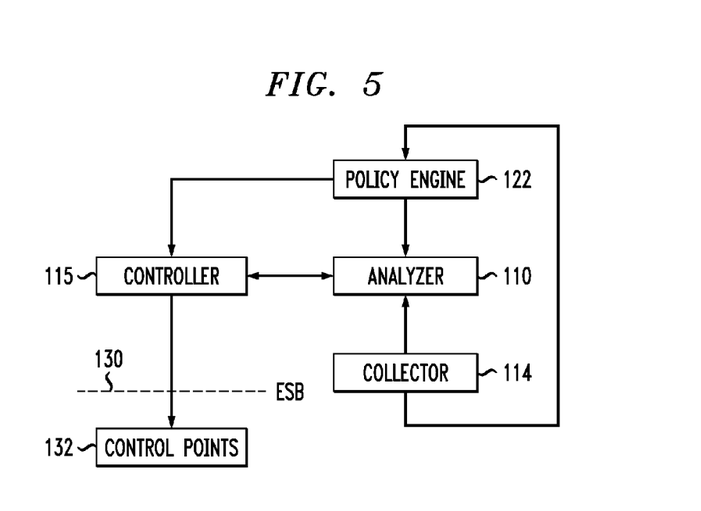

FIG. 5 shows further operations responsive to the computed KPIs. In this example, the analyzer 110 utilizes the computed KPIs to select and deploy a particular one of a plurality of policy sets provided by the policy engine 122. This selection may be based at least in part by movement of the operating point of the IT infrastructure 108 in a state space maintained by the situational analysis framework 112. Responsive to the selected policy, the controller 115 directs appropriate changes in settings or other configurable parameters of the IT infrastructure 108 via the control points 132. The process repeats continuously, with the collector 114 monitoring the IT infrastructure 108 and again communicating the gathered information to the analyzer 110 so as to permit computation of KPIs and further adjustments in the parameters of the IT infrastructure as required to deploy selected policy sets and to meet corresponding SLOs.

The above-noted monitoring may further include determining whether a particular change in the settings or other configurable parameters actually effects a change in the KPIs. Thus, if one strategy is not producing the desired change in the KPIs, a different strategy can be attempted. Also, automatic adjustment of settings or other configurable parameters based on policy may be turned on or off via one or more of the UI elements of the management framework 102. Additionally or alternatively, one or more recommendations for particular changes in the settings may be provided to the user via the recommendation element 144, such that the user is prompted to accept or decline the recommendations.

Figure 6:
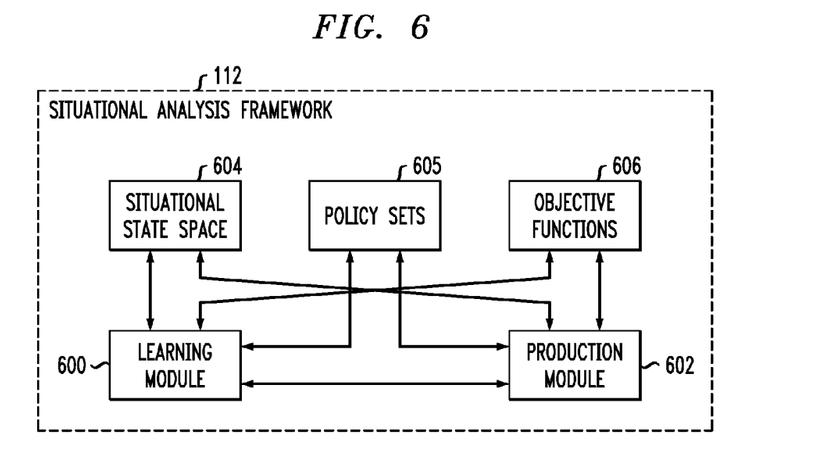
FIG. 6 shows a more detailed view of one possible implementation of the situational analysis framework of the FIG. 1 system.

FIG. 6 shows a more detailed view of one possible implementation of the situational analysis framework 112 of the information processing system 100. The situational analysis framework 112 in this embodiment comprises a learning module 600 coupled to a production module 602. Other components of the situational analysis framework 112 include situational state space 604, policy sets 605, and objective functions 606. The learning module and the production module both have access to the situational state space 604, policy sets 605, and objective functions 606. In operation, the situational analysis framework 112 determines the dimensions of the situational state space 604 that characterizes the operating conditions of the IT infrastructure 108, partitions the state space into states, associates the policy sets 605 with respective states of the state space 604, monitors system operation in the state space, and selects a particular one of the policy sets based on an identified current state in the state space.

The dimensions of the situational state space characterizing operating conditions of the IT infrastructure 108 may comprise two or more dimensions selected from different dimension categories, such as load, performance, time and event state. One or more of these categories may correspond to particular SLOs. As a more specific example, the dimensions utilized to define the state space to be described in conjunction with FIGS. 7A and 7B include an off-peak job duration SLO and a peak throughput SLO. Other types and arrangements of off-peak and peak SLOs may be used in other embodiments.

In order to associate the policy sets 605 with respective states of the state space 604, the situational analysis framework 112 determines an objective function, identifies candidate policy sets with respect to the state space, selects and deploys a particular one of the policy sets with respect to a given state of the state space, and then evaluates the objective function. The selecting and deploying are repeated until a specified criterion is met, and an optimal policy set is identified for each of the states of the state space. Also, the state space may be periodically repartitioned, and candidate policy sets identified with respect to the repartitioned state space. A particular one of the policy sets is then selected and deployed with respect to a given state of the repartitioned state space, and the objective function is evaluated. Again, the selecting and deploying are repeated until a specified criterion is met, and an optimal policy set is identified for each of the states of the repartitioned state space.

It should be noted that the learning module 600 of the situational analysis framework 112 need not always be utilized. For example, knowledge of best practices, performance relationships or other types of performance models may be used to set up the production module 602 to send hints, recommendations or other instructions to various layers of the infrastructure stack. Such hints, recommendations or other instructions may be sent using an out-of-band mechanism. Also, hybrid arrangements are possible, in which, for example, operation of the learning module 600 is supplemented based on known best practices, performance relationships or other types of performance models.

Similar techniques may be used to automate other types of changes to control points within the infrastructure, with or without use of the situational analysis framework 112. Thus, the system 100 can be configured such that performance optimizations are provided at least in part by making inferences based on observations and sharing those inferences with lower layers of the infrastructure stack. As a more particular example of such an inference, a hint or other instruction may be sent to a storage array indicating that a particular log-type virtual disk has a write-once read almost never behavior.

Additional details regarding the operation of a situational analysis framework of the type shown in FIG. 6 can be found in U.S. patent application Ser. No. 12/639,668, filed Dec. 16, 2009 and entitled "Data Storage System Having Associated Situational Analysis Framework for Automatic Response to Movement in a State Space," which is commonly assigned herewith and incorporated by reference herein.

Figure 7A:
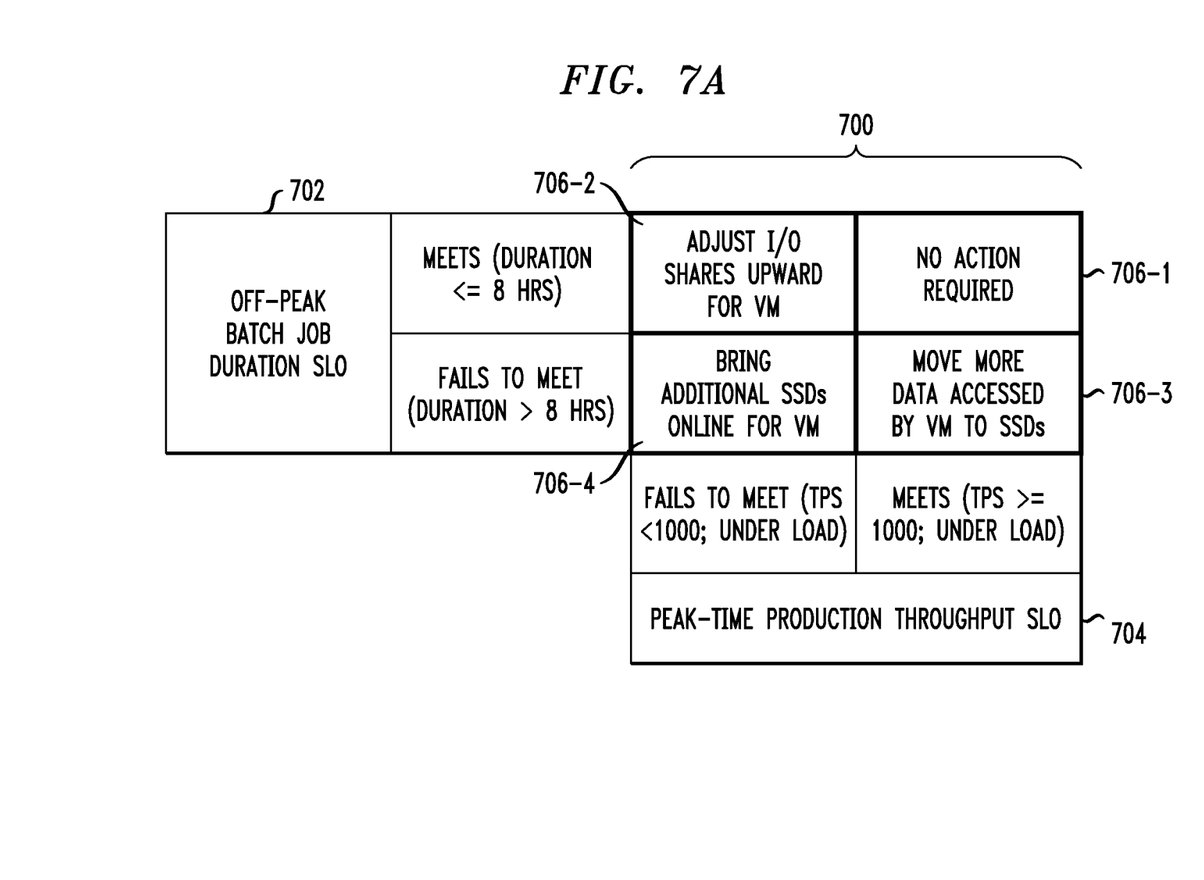
FIGS. 7A and 7B show examples of the operation of the FIG. 1 system as applied to coordination of multiple SLOs.

FIG. 7A shows an example of a situational state space 700 that may be implemented in element 604 of the situational analysis framework 112 for a particular virtual machine (VM) of the virtual infrastructure 155. As previously noted, the state space 700 in this example includes two dimensions, each based on a distinct SLO, one for off-peak time periods and the other for peak time periods. More specifically, a first dimension 702 of the state space 700 comprises an off-peak job batch job duration SLO and a second dimension 704 of the state space 700 comprises a peak-time throughput performance SLO. For the first dimension 702, the corresponding off-peak SLO requires that a batch job be completed in a time period less than or equal to 8 hours. Thus, the off-peak SLO is met if the batch job duration is less than or equal to 8 hours, and is not met if the batch job duration is greater than 8 hours. For the second dimension 704, the corresponding peak SLO requires that the number of transactions per second (TPS) under load be greater than or equal to 1000. Thus, the peak SLO is met if the TPS is greater than or equal to 1000, and is not met if the TPS is less than 1000.

The state space dimensions 702 and 704 of FIG. 7A separate the state space 700 into four distinct states, namely, a first state 706-1 in which both SLOs are met, a second state 706-2 in which the off-peak SLO is met but the production SLO is not met, a third state 706-3 in which the production SLO is met but the off-peak SLO is not met, and a fourth state 706-4, in which neither SLO is met.

The situational analysis framework 112 associates at least a portion of one of the policy sets 604 with each of the states 706 of the state space 700. The policy set defines appropriate actions to take in each state.

The first state 706-1 will generally require no action for the given virtual machine. However, in state 706-2, the corresponding policy indicates that input/output shares should be adjusted upward for this particular virtual machine. In state 706-3, the corresponding policy indicates that more of the data accessed by the virtual machine should be moved to solid state devices (SSDs), so as to reduce latency of input/output accesses leading to a shorter job duration. Finally, in state 706-4, the corresponding policy set indicates that additional SSDs should be brought online for the virtual machine. Such adjustments may be carried out under the direction of the controller 115, via one or more of the control points 132. This may involve use of the above-noted vCenter™ virtual infrastructure management system, or another type of infrastructure management tool.

The reference to SSDs in the foregoing example should not be construed as limiting in any way. Similar techniques may be applied using a wide variety of resources other than or in addition to SSDs, such as other types of permanent storage.

Also, in other embodiments, the corresponding policy sets may specify that appropriate hints, recommendations or other instructions be provided to particular elements of the IT infrastructure 108 via controller 115 and control points 132 so as to drive the operation of the IT infrastructure from one state to another within the situational state space.

For example, instead of the particular policy-driven actions that are described above for each of the states 706-2, 706-3 and 706-4 of the state space, the policies may generate other actions including IT infrastructure policy modifications, hints, recommendations or other instructions to a storage array or other element of the IT infrastructure 108.

Figure 7B:
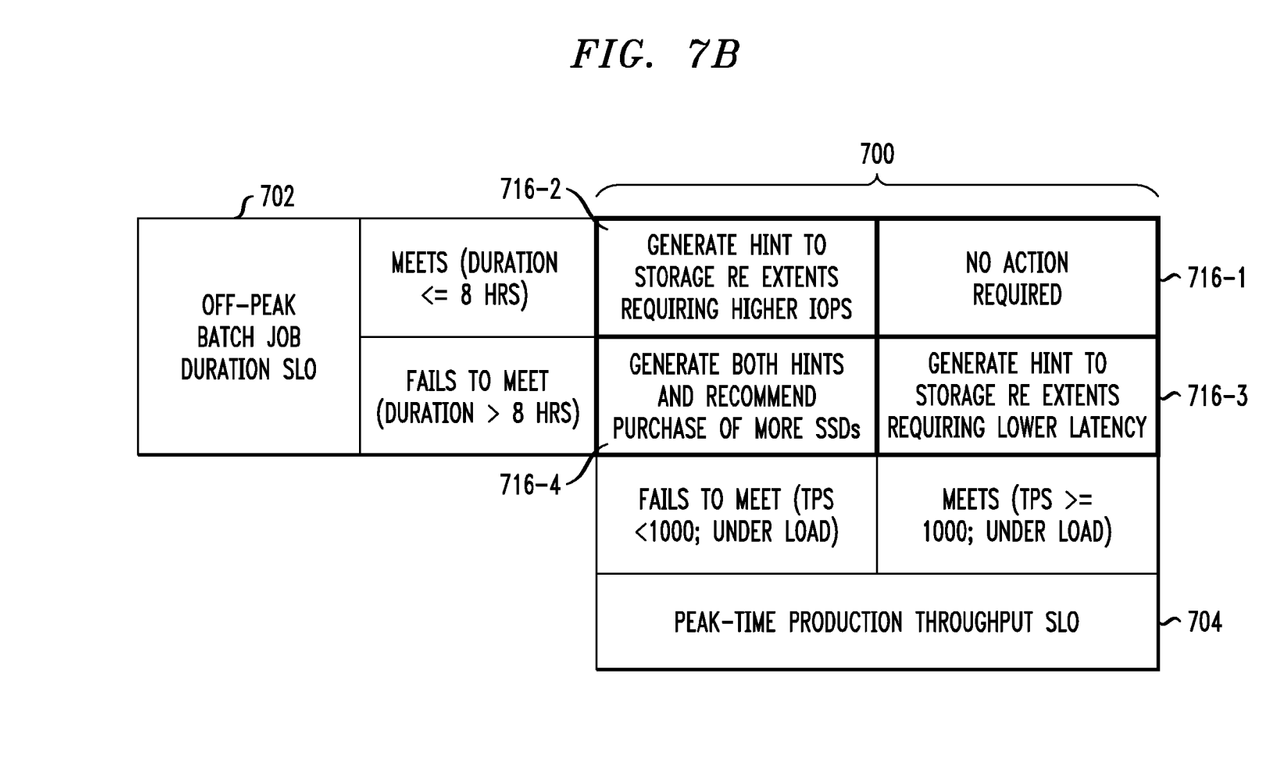

One possible arrangement of this type is illustrated in FIG. 7B. In this example, the state space 700 is separated into four states 716-1, 716-2, 716-3 and 716-4 using the same state space dimensions 702 and 704 of the FIG. 7A example. In the first state 716-1, both SLOs are met and thus no action is required. In states 716-2 and 716-3, the corresponding policies generate respective hints to a storage array or other storage element of the infrastructure 108 regarding the extents for which higher TOPS or lower latency are needed in order to meet the corresponding SLO. Similarly, with reference to state 716-4, the corresponding policy may generate not only the two hints mentioned above, but also a recommendation that additional SSDs or other resources should be deployed in the physical infrastructure to provide more benefit to the given virtual machine than can be provided using existing resources. This deployment of additional resources may be accomplished, for example, by reallocation of existing shared resources, or by purchase of new resources.

Thus, the controller 115 via one or more of the control points 132 may direct a particular element or particular elements of the IT infrastructure 108 to take actions that can enhance performance and facilitate achievement of one or more specified SLOs, or may additionally or alternatively provide hints, recommendations or other instructions that allow the IT infrastructure elements themselves to determine how best to improve a given deficient KPI. Such instructions can be directed to different layers of the IT infrastructure stack of FIG. 1C by translating SLOs to appropriate KPIs for each layer.

Although the examples in FIGS. 7A and 7B are illustrated for a single virtual machine, a given policy set may include policies for controlling multiple virtual machines, as well as other types of infrastructure elements in any combination. It should be noted that similar applications running in multiple virtual machines may have similar SLOs and therefore utilize the same or similar situational analysis.

The policy sets 605 available to the situational analysis framework can be adjusted via input/output policy engine 122, based on input received from tuning element 140, external policy element 142, and recommendation element 144. Other adjustments in the policy sets or other aspects of the operation of the analyzer 110 can be performed using other system elements. For example, learning module 600 of the situational analysis framework 112 can be active in the background during operation of the production module 602, and its results may periodically be applied to refine the policy sets 605 over time. Current and historical performance of elements of the virtual infrastructure 155 or other parts of IT infrastructure 108 can be visualized on display element 148 under control of the visualizer 120 in order to allow a system user to monitor compliance with one or more SLOs through such devices as KPI-based scorecards. The system 100 may additionally or alternatively perform a wide variety of other monitoring and analysis functions relating to adaptive optimization of the performance of the IT infrastructure 108, including, for example, fault location and root cause analysis of such faults. Thus, the monitoring and analysis functions need not relate solely to adaptive optimization of input-output performance, but could also or alternatively relate to other aspects of system performance such as maintenance and availability.

The illustrative embodiments provide numerous advantages over conventional techniques. For example, one or more of these embodiments can be used to implement dynamic and adaptive policy sets across thousands of virtual machines and other IT infrastructure elements for automated SLO management. The disclosed techniques can be used to monitor and dynamically remediate lower level KPIs that existing high level virtual infrastructure management tools cannot.

An information processing system in one or more of these embodiments therefore avoids the need for labor-intensive monitoring at multiple levels of the system by human administrators using traditional management tools, and provides an efficient automated mechanism for translating between application needs and corresponding actions that should be taken within virtual infrastructure or other types of IT infrastructure. This eliminates the conventional disconnect between application context and those actions that if carried out in particular elements of the IT infrastructure would best facilitate achievement of SLOs. Such an information processing system is therefore better able to react to dynamic workload changes and to achieve fairness in use of shared resources while also achieving the SLOs in an automated and efficient manner.

As indicated previously, adaptive input/output optimization functionality such as that described in conjunction with the system diagrams of FIGS. 1A-1C and the additional diagrams of FIG. 3 through 7 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing platform comprising at least one processing device having a processor coupled to a memory, wherein the processing platform implements a plurality of modules for adaptive optimization, the modules comprising:
   a collector configured to gather information from an information technology infrastructure;
   an analyzer coupled to the collector and configured to analyze the information gathered by the collector;
   a policy module specifying a plurality of policy sets; and
   a controller coupled to the collector, the analyzer and the policy module, and configured to adjust one or more parameters of the infrastructure via corresponding control points;

wherein associated with the analyzer is a situational analysis framework configured to periodically select and deploy for use by the controller a particular one of the specified plurality of policy sets responsive to changing operating conditions of the infrastructure.

2. The apparatus of claim 1 wherein the analyzer is operative to translate between service level objectives of a given virtual application and key performance indicators associated with particular components of the infrastructure.

3. The apparatus of claim 1 wherein the policy module comprises an input/output policy engine coupled between the controller and one or more elements of an external management framework including at least one of a tuning element, an external policy element and a recommendation element, the recommendation element having an input coupled to an output of the analyzer.

4. The apparatus of claim 1 wherein the plurality of modules further comprises a data services module coupled to the analyzer and having an associated repository.

5. The apparatus of claim 4 wherein the data services module is coupled between the analyzer and one or more elements of an external management framework including at least one of a chargeback element and a data retention element.

6. The apparatus of claim 1 wherein the plurality of modules further comprises a visualizer coupled between the analyzer and a display interface element of an external management framework.

7. The apparatus of claim 1 wherein the plurality of modules further comprises a planner coupled between the analyzer and a planner interface element of an external management framework.

8. The apparatus of claim 1 wherein the collector is interfaced to at least one of a performance feed, a feed adaptor to a probe point, and a resource discovery element associated with the infrastructure for gathering at least a portion of said information from the infrastructure.

9. The apparatus of claim 1 wherein the situational analysis framework is implemented within the analyzer.

10. The apparatus of claim 1 wherein the situational analysis framework comprises a learning module coupled to a production module.

11. The apparatus of claim 1 wherein the situational analysis framework is configured to determine dimensions of a situational state space characterizing the operating conditions of the infrastructure, to partition the state space into states, to associate the policy sets with respective states of the state space, to monitor system operation in the state space, and to select a particular one of the policy sets based on an identified current state in the state space.

12. The apparatus of claim 11 wherein said dimensions of the situational state space characterizing operating conditions of the infrastructure comprise two or more dimensions selected from at least one dimension category, and said at least one dimension category comprises one or more of load, performance, time and event state.

13. The apparatus of claim 12 wherein said dimensions of the situational state space comprise at least one of an off-peak service level objective and a peak service level objective.

14. A method comprising the steps of:
analyzing information gathered from an information technology infrastructure;
specifying a plurality of policy sets;
utilizing a controller to adjust one or more parameters of the infrastructure via corresponding control points; and
periodically selecting and deploying for use by the controller a particular one of the specified plurality of policy sets responsive to changing operating conditions of the infrastructure.

15. The method of claim 14 wherein the analyzing step further comprises translating between service level objectives of a given virtual application and key performance indicators associated with particular components of the infrastructure.

16. A computer program product comprising a processor-readable storage medium having encoded therein executable code of one or more software programs, wherein the one or more software programs when executed by a processing platform implement the steps of the method of claim 14.

17. A method comprising the steps of:
analyzing information gathered from an information technology infrastructure;
specifying a plurality of policy sets;
periodically selecting and deploying for use by a controller a particular one of the specified plurality of policy sets responsive to changing operating conditions of the infrastructure;
determining dimensions of a situational state space characterizing the operating conditions of the infrastructure;
partitioning the state space into states;
associating the policy sets with respective states of the state space;
monitoring operation of the infrastructure in the state space; and
selecting a particular one of the policy sets based on an identified current state in the state space.

18. The method of claim 17 wherein said dimensions of the situational state space characterizing operating conditions of the infrastructure comprise two or more dimensions selected from at least one dimension category, and said at least one dimension category comprises one or more of load, performance, time and event state.

19. The method of claim 17 wherein the associating step further comprises:
determining an objective function;
identifying candidate policy sets with respect to the state space;
selecting a particular one of the policy sets with respect to a given state of the state space;
deploying the selected policy set and evaluating the objective function;
repeating the selecting and deploying steps until a specified criterion is met; and
identifying an optimal policy set for each of the states of the state space.

20. The method of claim 19 further comprising the steps of:
repartitioning the state space;
identifying candidate policy sets with respect to the repartitioned state space;
selecting a particular one of the policy sets with respect to a given state of the state space;
deploying the selected policy set and evaluating the objective function;
repeating the selecting and deploying steps until a specified criterion is met; and
identifying an optimal policy set for each of the states of the repartitioned state space.

* * * * *